Patented Oct. 9, 1951

2,570,632

UNITED STATES PATENT OFFICE 2,570,632

IMPROVING THE CUT GROWTH RESISTANCE OF BUTADIENE-VINYL PYRIDINE RUBBERY COPOLYMERS

Bernard C. Barton, Clifton, N. J., assignor to United States Rubber Company, New York, N. Y., a corporation of New Jersey No Drawing. Application April 1, 1948,
Serial No. 18,496

10 Claims. (Cl. 260—31.8)

This invention relates to butadiene-vinyl pyridine rubbery copolymers and specifically to improving the cut growth resistance of such rubbery copolymers.

Rubbery copolymers of butadiene-1,3 and vinyl pyridine are well known materials, having been described in German Patent 695,098 and in U. S. Patent 2,402,020. However, vulcanized butadiene-vinyl pyridine copolymers have not exhibited satisfactory cut growth resistance with the result that their suitability for many purposes was greatly impaired.

I have now found that the cut growth resistance of butadiene-vinyl pyridine rubbery copolymers can be greatly enhanced by adding thereto, prior to curing, a small amount of an aromatic carboxylic acid. In some cases as little as 0.1 part by weight of the aromatic carboxylic acid per 100 parts by weight of butadiene-vinyl pyridine copolymer is sufficient to show improvement. However I prefer to employ from 1 to 6 parts by weight of the aromatic carboxylic acid per 100 parts by weight of the butadiene-vinyl pyridine rubbery copolymer because maximum improvement in cut growth resistance is found within this range. Larger amounts than 6% may be used but are generally unnecessary.

In a typical method of practicing my invention, a vulcanizable mix is prepared containing the butadiene-vinyl pyridine rubbery copolymer and the usual rubber compounding components such as carbon black, zinc oxide, softeners such as pine tar or asphalt or the like, stearic acid, the customary vulcanizing agent, generally sulfur, and vulcanization accelerators. In the formulation of the compound, in accordance with my invention there is incorporated a small amount of the aromatic carboxylic acid. The compounding is usually effected on the regular rubber mill in the usual manner. The resulting compound is then shaped in the usual way and vulcanized in accordance with conventional practice. The resulting vulcanizate exhibits greatly increased cut growth resistance over the same material made without the aromatic carboxylic acid, and none of its other physical properties are impaired. The practice of my invention does not interfere in any respect with the conventional compounding and vulcanizing techniques.

Any aromatic carboxylic acid may be employed in the practice of my invention. Examples of such acids which may be very successfully employed are salicylic acid, benzoic acid, phthalic acid or more usually phthalic anhydride (it being understood that the anhydrides of the aromatic polycarboxylic acids are used equivalently with the acids themselves in practicing the present invention), p-nitrobenzoic acid, alpha-naphthoic acid, beta-naphthoic acid, naphthalic acid or anhydride, gallic acid, etc. Any other aromatic carboxylic acid may be employed. I generally use the monocyclic and bicyclic aromatic carboxylic acids since they are most readily available. The aromatic carboxylic acid employed is generally free from substitution on the ring with groups other than hydroxyl or nitro groups. However they may be ring-substituted with groups such as halogen such as chlorine, amino groups, alkyl groups (as in toluic acid and xylic acid), a phenyl group (as in diphenic acid), where such other groups do not cause the resulting compound to exert a harmful effect upon the butadiene-vinyl pyridine rubbery copolymer. The aromatic carboxylic acid is usually a monocarboxylic acid but it may be a dicarboxylic acid or even a tricarboxylic acid.

The preferred aromatic carboxylic acids for use in the practice of my invention are the monocyclic and bicyclic monocarboxylic and dicarboxylic acids, and anhydrides of such dicarboxylic acids, said acids either being otherwise unsubstituted on the ring or being ring-substituted with nitro or hydroxyl groups. Benzoic acid, salicylic acid and phthalic anhydride are most highly preferred for use in my invention because they combine low cost with high effectiveness in improving cut growth resistance.

I have found that ordinary aliphatic saturated monocarboxylic and polycarboxylic acids, such as the unsubstituted fatty acids and aliphatic dibasic acids, are not capable of producing the marked increase in cut growth resistance of butadiene-vinyl pyridine rubber that is produced by the aromatic carboxylic acids of my invention. This is illustrated below by a comparison of Examples 9 to 11 with comparative Examples 5 to 8 wherein acids of the present invention were used.

Instead of the aromatic carboxylic acids specifically named above, I may employ halogen-substituted aromatic carboxylic acids such as the chlorobenzoic acids, amino-substituted aromatic carboxylic acids such as the aminobenzoic acids, other hydroxy substituted aromatic carboxylic acids such as m-hydroxybenzoic acid, p-hydroxybenzoic acid, etc., protocatechuic acid, isophthalic acid, terephthalic acid, nitronaphtalic acids, etc.

Any butadiene-vinyl pyridine rubbery copolymer may be used in the practice of the present invention. I usually employ a rubbery copolymer of butadiene and 2-vinyl pyridine but the vinyl group may be in any other position on the pyridine, as exemplified by 4-vinyl pyridine. The vinyl pyridine may also be substituted on the pyridine with an alkyl group, as typified by 2-methyl-6-vinyl pyridine. The proportions of butadiene-1,3 and the vinyl pyridine used in making the rubbery copolymer may vary widely as is well known in the art. Usually from 25 to 75% of butadiene and correspondingly from 75 to 25% of the vinyl pyridine are employed. The polymerization of these two monomers is conducted in any manner known to the art, aqueous emulsion polymerization generally being used. The method of making the butadiene-vinyl pyridine rubbery copolymer does not constitute per se any part of the present invention.

The following experiments show the effectiveness of aromatic carboxylic acids in improving cut growth resistance of rubbery butadiene-vinyl pyridine copolymers. Contrary to the well-known retarding effect which acids exert on the curing of natural rubber and GR-S (butadiene-styrene rubbery copolymer), the effect which the aromatic carboxylic acids employed in accordance with the present invention exerts upon the curing of the vinyl pyridine rubber is either nil or small as judged by the modulus of the vulcanizate.

The copolymer used in all of the experiments described hereinafter was made from monomers consisting of butadiene-1,3 and 2-vinyl pyridine in a ratio of 75 parts butadiene to 25 parts 2-vinyl pyridine. All parts herein are by weight.

EXAMPLE 1

Stock 1

| | Parts by weight |
|---|---|
| Butadiene-vinylpyridine copolymer | 100 |
| Carbon black | 50 |
| Zinc oxide | 5 |
| Pine tar | 5 |
| Stearic acid | 3 |
| Benzothiazyldisulfide | 0.15 |
| Sulphur | 1.6 |

Stock 1A

The same as Stock 1, but containing in addition 2.0 parts of salicyclic acid.

EXAMPLE 2

Stock 2

| | |
|---|---|
| Butadiene-vinylpyridine copolymer | 100 |
| Carbon black | 50 |
| Asphalt | 7 |
| Benzothiazyldisulfide | 3 |
| Sulphur | 1.5 |

Stock 2A

The same as stock 2, but containing in addition 2.0 parts of salicyclic acid.

EXAMPLE 3

Stock 3

| | |
|---|---|
| Butadiene-vinylpyridine copolymer | 100 |
| Carbon black | 50 |
| Asphalt | 7 |
| Benzylidenebis-dimethyldithiocarbamate | 1 |
| Zinc oxide | 1 |
| Sulphur | 1.5 |

Stock 3A

The same as Stock 3, but containing in addition 2.0 parts of salicyclic acid.

The foregoing stocks were compounded on a rubber mill in the ordinary manner. Test results on these stocks, after curing in a mold in a press under 45 pounds per square inch steam pressure for various times, were as follows:

| | Time of Cure (minutes) | Cut Growth Resistance (kilocycles per inch of growth) | Modulus Stress at 300% Elong. (p. s. i.) | Tensile Strength (p. s. i.) | Per Cent Elong. at Break |
|---|---|---|---|---|---|
| Stock 1 (no acid) | 30 | 450 | 1,300 | 2,700 | 500 |
| | 60 | 370 | 1,450 | 2,700 | 450 |
| | 120 | 365 | 1,600 | 2,600 | 450 |
| Stock 1A (2.0 pts. salicylic acid) | 30 | 895 | 1,100 | 2,400 | 550 |
| | 60 | 1,000 | 1,200 | 2,600 | 510 |
| | 120 | 910 | 1,400 | 2,500 | 490 |
| Stock 2 (no acid) | 25 | 290 | 590 | 1,250 | 590 |
| | 45 | 280 | 900 | 2,000 | 560 |
| | 90 | 190 | 1,000 | 2,150 | 510 |
| Stock 2A (2.0 pts. salicylic acid) | 25 | 520 | 375 | 1,100 | 725 |
| | 45 | 485 | 575 | 1,775 | 620 |
| | 90 | 520 | 890 | 2,250 | 555 |
| Stock 3 (no acid) | 25 | 260 | 1,160 | 2,275 | 515 |
| | 45 | 220 | 1,375 | 2,400 | 470 |
| | 90 | 190 | 1,275 | 2,600 | 515 |
| Stock 3A (2.0 pts. salicylic acid) | 25 | 690 | 1,080 | 2,725 | 600 |
| | 45 | 660 | 1,170 | 2,710 | 580 |
| | 90 | 640 | 1,480 | 2,210 | 400 |

From the foregoing table, the greatly superior cut growth resistance of the vulcanizates from mixtures containing salicylic acid over those containing no acid is readily apparent.

EXAMPLES 4 TO 11

The following are additional experiments showing the effectiveness of salicylic acid, benzoic acid, phthalic anhydride and p-nitrobenzoic acid in improving cut growth life in accordance with my invention. Comparisons are made with vulcanizates which were identical except that they contained aliphatic saturated carboxylic acid, namely acetic acid (Example 9), oxalic acid (Example 10) and stearic acid (Example 11). All of the stocks tested except the ones used in the first two runs (Example 4) contained acid in the amount indicated added to a portion of the following master batch prepared with the same copolymer as was used in the previous examples.

| | Parts by weight |
|---|---|
| Butadiene-vinylpyridine copolymer | 100 |
| Carbon black | 50 |
| Pine tar | 2 |
| Zinc oxide | 5 |
| Sulfur | 2 |
| Benzylidene bis-dimethyldithiocarbamate | 0.5 |

The stress of 300% elongation and the cut growth resistance were determined on portions of stock containing the various acids, cured for 30 minutes and 60 minutes at 45 p. s. i. steam pressure as indicated. As a control, the same tests were made on a portion of the cured master batch containing no added acid.

| Example | Acidic Substance Added | Parts by Wt. of Acid (per 159.5 parts of master batch) | Cure (Minutes at 45# steam) | Modulus Stress at 300% Elongation (p.s.i.) | Cut Growth Resistance (kilocycles per inch of growth) |
|---|---|---|---|---|---|
| 4a | None | | 30 | 1,725 | 115 |
| 4b | do | | 60 | 1,730 | 60 |
| 5a | salicylic acid | 3.0 | 30 | 1,450 | 220 |
| 5b | do | 3.0 | 60 | 1,675 | 275 |
| 6a | benzoic acid | 2.8 | 30 | 1,700 | 290 |
| 6b | do | 2.8 | 60 | 1,810 | 265 |
| 7a | phthalic anhydride | 3.2 | 30 | 1,350 | 170 |
| 7b | do | 3.2 | 60 | 1,750 | 265 |
| 8a | p-nitrobenzoic acid | 3.6 | 30 | 1,550 | 290 |
| 8b | do | 3.6 | 60 | 1,725 | 270 |
| 9a | Acetic acid | 1.3 | 30 | 1,950 | 60 |
| 9b | do | 1.3 | 60 | 2,150 | 70 |
| 10a | Oxalic acid | 2.8 | 30 | 1,875 | 135 |
| 10b | do | 2.8 | 60 | 2,100 | 80 |
| 11a | Stearic acid | 6.4 | 30 | 1,450 | 125 |
| 11b | do | 6.4 | 60 | 1,600 | 130 |

EXAMPLES 12 TO 15

Following are tests showing the effect of using alpha-naphthoic acid, naphthalic anhydride and gallic acid in improving cut growth. The same master batch as was used in the preceding series of experiments (Examples 4 to 11) was used. With 159.5 parts of this master batch there were incorporated three parts of each of the three acids. A comparative run containing no acid (Example 12) was vulcanized under the same conditions, namely, for 60 minutes at 45 lbs. of steam pressure. The results were as follows:

| | Control | Acids | | |
|---|---|---|---|---|
| Example No | 12 | 13 | 14 | 15 |
| Master Batch | 159.5 | 159.5 | 159.5 | 159.5 |
| Alpha-Naphthoic Acid | | 3 | | |
| Naphthalic Anhydride | | | 3 | |
| Gallic Acid | | | | 3 |
| Stress At 300% Elongation (p.s.i) | 1,800 | 1,825 | 1,610 | 960 |
| Cut Growth Resistance (kilocycles per inch of growth) | 40 | 185 | 70 | 130 |

The variations in stress and in tensile strength of the various materials made as described in the foregoing examples are without any substantial significance. All of the stocks tested were good stocks.

From the foregoing it will be apparent that the present invention provides a simple and economical method of overcoming the serious disadvantage of vulcanizates made from rubbery butadiene-vinyl pyridine copolymers, namely their low resistance to cut growth. Incorporation of the aromatic carboxylic acids of the present invention into the mix is carried out readily by standard technique and standard compounding and vulcanizing equipment are employed. The aromatic carboxylic acids do not have any adverse or deleterious effect during compounding and vulcanizing or upon the vulcanized product. The preferred aromatic carboxylic acids namely phthalic anhydride, salicylic acid and benzoic acid, arranged in order of increasing cost at the present-day market, are comparatively cheap and readily available and therefore do not present any problem of unduly increasing the cost of manufacture of cured butadiene-vinyl pyridine copolymer rubber products.

Having thus described my invention, what I claim and desire to protect by Letters Patent is:

1. As a new composition of matter, cured butadiene-vinyl pyridine rubbery copolymer the cut growth resistance of which is substantially enhanced by curing in the presence of a material selected from the group consisting of ring-carboxylic aromatic monocarboxylic and polycarboxylic acids and anhydrides of such polycarboxylic acids, in an amount ranging from 0.1 to 6% by weight based on the weight of said rubbery copolymer.

2. As a new composition of matter, cured butadiene-vinyl pyridine rubbery copolymer the cut growth resistance of which is substantially enhanced by curing in the presence of a material selected from the group consisting of ring-carboxylic aromatic monocarboxylic and polycarboxylic acids and anhydrides of such polycarboxylic acids, in an amount ranging from 1 to 6% by weight based on the weight of said copolymer.

3. As a new composition of matter, cured butadiene-vinyl pyridine rubbery copolymer the cut growth resistance of which is substantially enhanced by curing in the presence of from 1 to 6% by weight based on the weight of said copolymer of salicylic acid.

4. As a new composition of matter, cured butadiene-vinyl pyridine rubbery copolymer the cut growth resistance of which is substantially enhanced by curing in the presence of from 1 to 6% by weight based on the weight of said copolymer of benzoic acid.

5. As a new composition of matter, cured butadiene-vinyl pyridine rubbery copolymer the cut growth resistance of which is substantially enhanced by curing in the presence of from 1 to 6% by weight based on the weight of said copolymer of phthalic anhydride.

6. As a new composition of matter, a vulcanizable mixture containing a butadiene-vinyl pyridine rubbery copolymer and from 1 to 6% by weight based on the weight of said copolymer of a material selected from the group consisting of ring-carboxylic aromatic monocarboxylic and polycarboxylic acids and anhydrides of such polycarboxylic acids, said mixture upon vulcanization yielding a vulcanized rubber having a cut growth resistance which is substantially greater than an identical rubber which does not contain said material.

7. The process of making vulcanized butadiene-vinyl pyridine copolymer rubber of substantially increased cut growth resistance which comprises forming a vulcanizable mixture containing butadiene-vinyl pyridine rubbery copolymer and from 1 to 6% by weight based on the weight of said copolymer of a material selected from the group consisting of ring-carboxylic aromatic monocarboxylic and polycarboxylic acids and anhydrides of such polycarboxylic acids, and vulcanizing said mixture.

8. The process of claim 7 wherein said acid is salicylic acid.

9. The process of claim 7 wherein said acid is benzoic acid.

10. The process of claim 7 wherein said acid is phthalic anhydride.

BERNARD C. BARTON.

REFERENCES CITED

The following references are of record in the file of this patent:

UNITED STATES PATENTS

| Number | Name | Date |
|---|---|---|
| 2,381,059 | Jones | Aug. 7, 1945 |
| 2,396,967 | Phillips | Mar. 19, 1946 |
| 2,402,020 | Cislake | June 11, 1946 |

FOREIGN PATENTS

| Number | Country | Date |
|---|---|---|
| 117,438 | Australia | Sept. 9, 1943 |
| 238,277 | Switzerland | Oct. 16, 1945 |
| 413,283 | Great Britain | July 11, 1934 |

OTHER REFERENCES

The Vanderbilt 1948 Rubber Handbook, pp. 436 to 439, Vanderbilt Co., 1948.